United States Patent Office 3,433,436
Patented Mar. 18, 1969

3,433,436
BALL RELEASE MECHANISM
Robert A. Mattey, Glen Burnie, Md., assignor to the United States of America as represented by the Secretary of the Navy
Filed Mar. 20, 1967, Ser. No. 624,615
U.S. Cl. 244—1
Int. Cl. B64g 1/10; F16b 7/10
7 Claims

ABSTRACT OF THE DISCLOSURE

The invention relates to a satellite stabilizer and means for releasably latching the stabilizer to a satellite. According to the invention, a spherical weight is attached to the end of a generally cylindrical actuating shaft which is secured to the end of a retractable boom. With the boom in a retracted position, the weight is received in a cup-like support on the wall of the satellite. A plurality of slidable latch plungers protrude radially from the weight and releasably latch the weight to said support. Upon movement of the boom toward an extended position, the latch plungers slidably disengage from the cup-like support, thereby unlatching the weight to permit its extension with the boom.

---

This invention relates generally to gravity gradient stabilization apparatus for earth satellites. More particularly it relates to a satellite stabilizer having improved latch mechanism for detachably connecting it to a satellite.

Earth satellites are effectively oriented in the upper atmosphere by gravity gradient stabilizers which may include weights supported at the ends of extendible booms. A recurring problem, encountered particularly during the launch of an earth satellite, is that of preventing excessive vibration and movement of the boom stabilizers when they are in retracted positions. The present invention was developed to solve this problem, and includes a particular satellite stabilizer having improved latching mechanism for attaching a weight at the end of an extendible boom and for detachably connecting the weight to a fixed support on a satellite wall to preclude vibration and excessive movement of said stabilizer.

It is therefore an object of the invention to provide means for detachably latching a weight to a satellite and for securing said weight to the end of an extendible boom.

A further object of the invention is to provide means for attaching a weight at the end of an extendible boom and for actuating a slidable release mechanism which latches said weight to a fixed support.

A still further object of the invention is to provide means which, in a first position, will cooperate with latching mechanism for releasably holding a weight adjacent to a wall of a satellite and that, in a second position, will release said weight, permitting its deployment at the end of an extendible boom.

Still another object of the invention is to provide means for resiliently unlatching a weight from a fixed support on a satellite wall and for damping oscillations of said weight at the end of an extendible boom.

Figure 1:
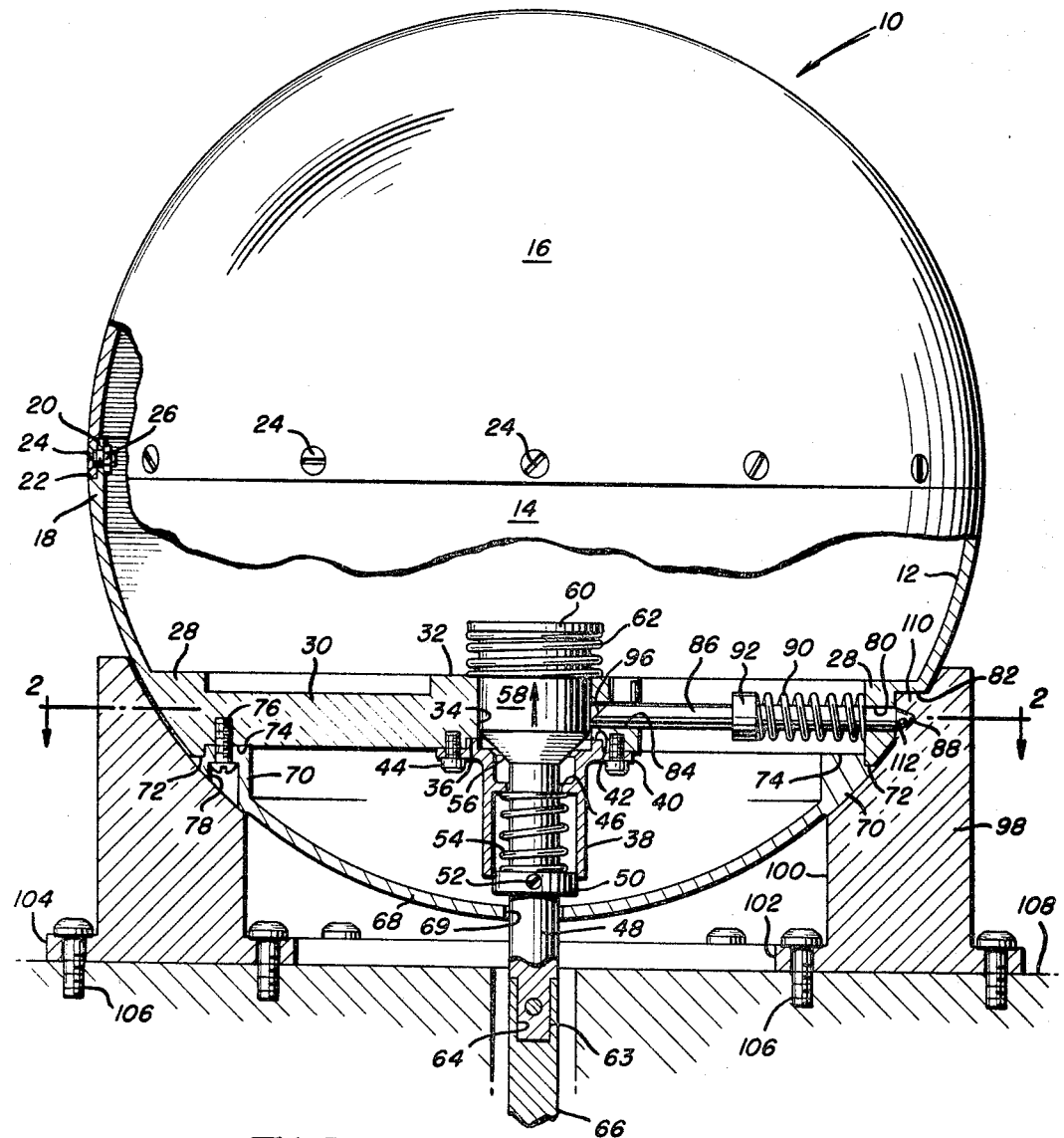
Figure 2:
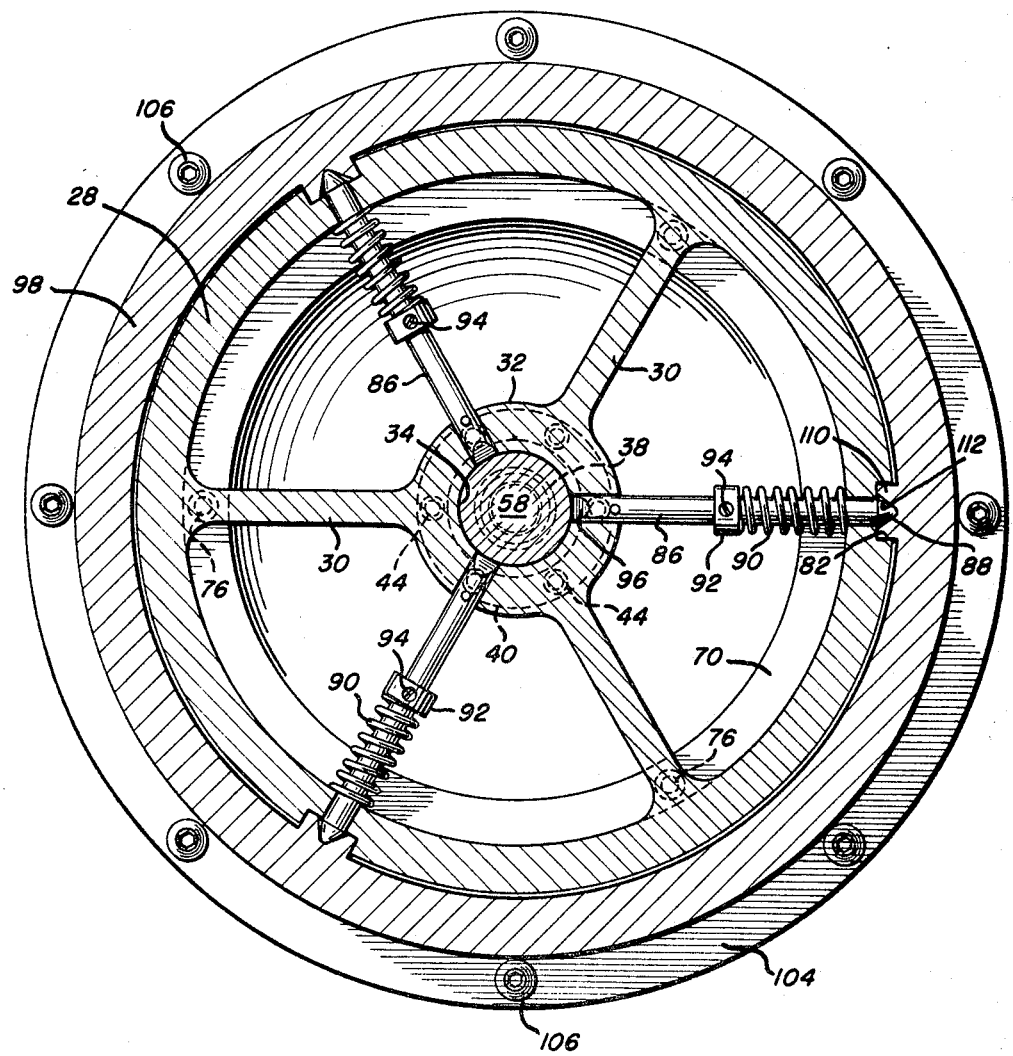

Other objects and many of the attendant advantages of the present invention will be readily appreciated as the same becomes better understood by reference to the following detailed description when considered in conjunction with the accompanying drawings, wherein:

FIG. 1 is an elevation partially in section illustrating a generally spherical weight releasably latched in place upon a support, and FIG. 2 is a section along the line 2—2 of FIG. 1.

With more particular reference to the drawing a spherical weight is shown generally at 10. Said weight is comprised of a relatively thin wall 12 and is divided at its equator into a base 14 and a cover 16 for said base. The base 14 has a thickened rim 18 supporting an upwardly directed flange 20. The cover 16 is provided with a rim 22 which abuts the rim 18 of the base 14. The inner surface of the cover 16 immediately adjacent the rim 22 overlies the upwardly directed flange 20 and is securely fastened thereto by a plurality of circumferentially spaced bolts 24. Said bolts are countersunk in the cover 16 adjacent its rim 22 and extend through the upwardly directed flange 20. As shown in FIG. 1, a locknut 26 is threadably secured to each of said bolts to secure the cover 18 to the base 14.

As more clearly shown in FIG. 2, a relatively thick inwardly extending reinforcing ring 28 is formed integrally with the relatively thin wall 12 and has three spaced, radially directed spokes 30 which cooperate to support a central hub 32 internally of the base 14 of said weight and above the bottom thereof.

With reference to FIG. 1, the central hub 32 is provided with a vertical bore 34, the lower end of which opens into a shallow annular recess 36 in the base of said hub. An elongated collar 38 is secured to the base of said hub. More particularly, the collar 38 is provided at its upper end with an external annular flange 40 having an upwardly directed lip 42, which lip engages in the shallow annular recess 36 in the base of the hub 32. The annular flange 40 abuts the base of said hub and is secured thereto by a plurality of cap screws 44. The elongated collar 38 is open at its lower end and additionally includes an internal annular rim 46, for a purpose to be described hereinafter.

A generally cylindrical actuating shaft 48 is slidably received within the elongated collar 38 and is provided with a ring 50 which is secured in place by a set screw 52 and is slidably received in the lower end portion of the collar 38. A coil spring 54 surrounds the actuating shaft 48 and is retained within the elongated collar 38 by the ring 50. The upper end of the spring 50 engages the rim 46 of said collar.

The upper portion of the actuating shaft 48 includes a frusto-conical wall 56 immediately adjacent an enlarged cylindrical end portion 58 that is slidably received in the bore 34 of the hub 32. Said enlarged portion 58 partially protrudes above the top surface of said hub and has an annular flange 60 at its upper end. A coil spring 62 surrounds said protruding portion and is confined between the flange 60 and the top surface of the hub 32. At its lower end, the actuating shaft 48 terminates in a reduced diameter plug 63 which is suitably secured in a socket 64 in the end of an extendible boom, a portion of which is shown at 66.

The base of the weight 10 includes a removable cover plate 68 which has a central bore 69 to accommodate the slidable actuating shaft 48. The cover plate has a thickened rim 70, a portion of which, as shown at 72, engages the lower surface of the reinforcing ring 28, and another portion of which rim, as shown at 74, engages the lower surfaces of the radially directed spokes 30. A plurality of screws, such as the one shown at 76, are recessed in a corresponding plurality of sockets 78 in the rim 70 and secure the cover plate 68 to the spokes 30.

As more clearly shown in FIG. 2, the annular reinforcing ring 28 of the base 14 is provided with three circumferentially spaced bores 80 which confront a corresponding number of recesses 82 in the external surface of said base. The central hub 32 is provided with three radially directed bores 84 aligned respectively with the bores 80 and the recesses 82. A slidable latch plunger 86 is received in each aligned pair of bores 80 and 84 and, with further reference to FIG. 1, the outer end portions of each latch plunger 86 is tapered at 88 and protrudes into one of the recesses 82. A coil spring 90 surrounds each latch plunger and is maintained against the inner wall of the reinforcing ring 28 by a collar 92 surrounding said latch plunger and secured thereto by a set screw 94. The inner end of each latch plunger is beveled as shown at 96 and, in the position shown in FIG. 1, engages the cylindrical wall of the enlarged upper end portion 58 of the actuating shaft 48.

Normally, with the boom 66 in a retracted position, as shown in FIG. 1, the weight 10 is received on a cup-like support 98 which has an enlarged central bore 100 and on its base, both an internal and an external annular flange 102 and 104, respectively. The support may be secured, by a plurality of machine screws 106 in the flanges 102 and 104, to the surface of a satellite, a portion of which is shown at 108. As clearly shown in FIG. 2, the support 98 may be provided, on its cup-shaped surface, with a plurality of raised bosses 110, each of which fits into a mating recess 82 in the surface of the spherical weight 10. The tapered outer end portion 88 of each latch plunger 86 engages in a tapered recess 112 in each of the bosses 110, to releasably latch the weight 10 on the support 98. More particularly, the enlarged end portion 58 of the actuating shaft 48 engages each latch plunger, forcing it against the compression of the spring 90, to engage in a corresponding tapered recess 112 in the support 98. Additionally, with the boom 66 in a retracted posiiton, the coil spring 62 is compressed against the hub 32 to positively urge the weight 10 to seat on the cup-like support 98.

As is well-understood in the art, the boom 66 may be extended to a desired length by a drive means (not shown). Again with reference to FIG. 1, upon initial movement of the boom toward its extended position, the enlarged portion 58 of the actuating shaft 48 will move in the direction indicated by the arrow, and the frusto-conical wall 56 will engage the inwardly directed ends of the latch plungers, which will be biased by their coil springs 90 to follow said frusto-conical wall and simultaneously slide axially toward each other to unlatch the weight 10 from the cup-like support. More particularly, the tapered end portions 88 of the latch plungers will disengage from the tapered recesses 112 of said cup-like support to unlatch the weight 10 therefrom and permit the extension of said weight at the end of the boom 66. Additionally, the resilient action of the compressed coil spring 62 will assist in initially moving the frusto-conical wall of the actuating shaft 48 along the inwardly directed ends of the latch plungers. Since the sliding action of the latch plungers is simultaneous and directed only radially toward the actuating shaft 48, said plungers will disengage from the cup-like support without the presence of shock or unbalanced forces which would tend to disrupt the orientation of the satellite 108 in free space. The coil spring 54 will be compressed only slightly upon the initial outward movement of the boom 66 and will cooperate with the coil spring 62 to eliminate oscillations of the weight 10 at the end of said boom.

When the boom is returned to its retracted position, as shown in FIG. 1, the coil spring 62 will be compressed, as described, to urge the weight 10 to seat positively upon the cup-like support 98. The beveled ends 96 of the latch plungers 86 will impinge on the frusto-conical wall 56 of the actuating shaft 48 and will be cammed to slide outwardly thereby as the boom 66 is being retracted until their outwardly directed end portions 88 engage in the tapered recesses 112 of the cup-like support 98.

Obviously, many modifications and variations of the present invention are possible in the light of the above teachings.

What is claimed is:
1. A release mechanism, comprising
   a support,
   a weight receivable on said support and comprising an internal ring,
   slidable means on said weight for releasably engaging said support, said slidable means including a plurality of latch plungers slidably supported by said internal ring substantially within said weight,
   a plurality of spokes on said internal ring, substantially within said weight and alternately spaced with respect to said latch plungers for supporting said ring, and
   a shaft attached to said weight and cooperating with said slidable means for releasably latching said weight to said support, said slidable means being disengageable from said support upon sliding movement of said latch plungers.

2. The structure as recited in claim 1, and further including a hub supported by said plurality of spokes and receiving the upper end portion of said shaft.

3. The structure as recited in claim 2, and further including,
   resilient means on said upper portion of the shaft for urging said weight to seat positively on said support.

4. The structure as recited in claim 3, and further including
   means on said shaft for camming said latch plungers to engage said support upon movement of the shaft.

5. The structure of claim 3, and further including,
   means cooperating with said resilient means for damping oscillations of said weight.

6. In combination with a satellite and an extendible boom on the satellite,
   a support secured to the satellite,
   a weight receivable on said support,
   a shaft slidably received by said weight and securing said weight at the end of the boom, said shaft including a frusto-conical wall,
   a plurality of slidable latch plungers, each having one end impinging on said shaft and being engaged at its opposite end in said support, said latch plungers being slidable out of engagement with said support upon movement of the inner ends thereof along the frusto-conical wall incident to sliding movement of the shaft, and
   resilient means on said shaft for urging said weight to seat positively on said support.

7. The structure as recited in claim 6, and further including,
   means cooperating with said resilient means for damping oscillations of said weight at the end of the boom.

References Cited
UNITED STATES PATENTS
3,123,842  3/1964  Oeland et al. _____ 9—9
3,148,846  9/1964  Newton.
3,174,706  3/1965  Wagner.

FERGUS S. MIDDLETON, *Primary Examiner.*

U.S. Cl. X.R.

287—58; 24—211, 230; 9—9; 114—16.7